May 1, 1956 H. TOOMIM ET AL 2,744,222

DYNAMIC CAPACITOR

Filed March 24, 1952 2 Sheets-Sheet 1

INVENTORS.
HERSHEL TOOMIM
GEORGE HENRY HARE
BY THEIR ATTORNEYS.
HARRIS, KIECH, FOSTER & HARRIS
BY

INVENTORS.
HERSHEL TOOMIM
GEORGE HENRY HARE
BY THEIR ATTORNEYS.
HARRIS, KIECH, FOSTER & HARRIS
BY [signature]

United States Patent Office 2,744,222

Patented May 1, 1956

2,744,222

DYNAMIC CAPACITOR

Hershel Toomin, North Hollywood, and George Henry Hare, Pasadena, Calif., assignors to Beckman Instruments, Inc., South Pasadena, Calif., a corporation of California Application March 24, 1952, Serial No. 278,176

19 Claims. (Cl. 317—249)

This invention relates to electrometer-amplifiers employing a dynamic capacitor and used in the measurement of small magnitude signals, particularly D. C. or slowly varying voltage signals, wherein extremely high input impedance is required. The circuit arrangement of the invention is, in addition, generally applicable to any class of amplifiers wherein a direct current input signal is modulated to produce an alternating current, which current is applied to an A. C. amplifier, particularly if the resulting frequency of modulation is a multiple of the modulator-exciting frequency, as in the instances hereinafter cited. Specifically, the invention is directed to an improved dynamic capacitor and to a circuit arrangement for amplifying the output thereof.

The new dynamic capacitor and the circuit arrangement in which it is incorporated are both also applicable with outstanding advantages to the detection, amplification and measurement of current signals, by simple adaptation of the arrangement herein disclosed. Moreover, the same combination of dynamic capacitor and circuit arrangement provides a particularly valuable and improved design for a regulated D. C. power supply. For the purpose of the present disclosure, however, and to illustrate the principles involved, the invention is described herein primarily as applied to voltage signals. The specific circuit arrangement is an electrometer designed to measure hydrogen-ion concentration or pH, particularly with a glass electrode.

In a typical dynamic capacitor electrometer, the D. C. signal is applied to the capacitor-modulator, the plates of which vary in spacing cyclically and thereby convert the signal into alternating current. The alternating current, which varies in magnitude with the magnitude of the signal, is applied to the input of an A. C. amplifier, the amplifier output being then usually converted to D. C. in a suitable manner to provide a measure of the input signal. Preferably, the circuit operates as a negative feedback amplifier, the amplifer output being demodulated by rectifying and filtering to generate a voltage which is returned to the input in series with and opposed to the input signal. In this way the amplified D. C. feedback signal can be made an accurate measure of input signal, the measurement being essentially independent of amplifier gain and other circuit variables.

The dynamic capacitor and the dynamic capacitor electrometer, already described in several prior publications, represent an important advance in the art of electrometer design. Among the prior publications may be mentioned, the patents to Fearon, 2,361,389, Scherbatskoy, 2,349,225, Dorsman, 2,372,062, and Palevsky, 2,483,-981, and the article "Design of Dynamic Condenser Electrometers" by Palevsky, Swank and Grenchic in The Review of Scientific Instruments, vol. 18, No. 5, 298–314, 1947.

Many of the advantages offered by such an electrometer result from the use of A. C. amplification, the carrier frequently being higher than the variations of the signal being measured. The D. C. component of the signal is not passed and therefore the D. C. stability of the tubes is of no consequence. Neither change of cathode temperature nor variations in supply voltage, nor so-called "grid bias drift" in the first amplifier stage result in zero drift in the instrument indication. In fact, in a well-designed dynamic capacitor electrometer, except for changes in contact potential, all the usual principal causes of drift are either absent or insignificant. A further important advantage is that such an electrometer can measure voltage from sources of exceptionally high impedance without introducing instrument loading error.

With reference to the modulator itself, an object of the invention is to provide a dynamic capacitor-modulator that, compared to prior art devices, is both superior in performance and inexpensive in construction. In this regard, a feature of the invention is the manner in which the contact potential of the two plates of the capacitor is minimized and permanently stabilized.

The problem presented by contact potential has heretofore been the most serious stumbling block in attempts to apply the principle of dynamic capacitor modulation to the accurate measurement of small magnitude signals. The problem is difficult because even the slightest contamination of the surfaces seriously affects the contact potential. Any attempt to avoid or minimize surface contamination by the use of solvents and detergents is self-defeating because inevitably residual cleaning material clings to the surfaces. In the Palevsky patent it is stated that there is no known satisfactory way of matching two pieces of metal so as to minimize contact potentials. The procedure set forth in the Palevsky patent and in the above-mentioned article is to electrodeposit pure gold on the plates of the capacitor. Exceptional care is required not only in the deposition process itself but also in all of the preparatory steps.

In the present invention, the problem of minimizing contact potential is solved by abrading the plate surfaces in a uniform manner, preferably by sandblasting the surfaces, although any equivalent method of dry abrasion may likewise be employed. The low contact potential attained in this manner is stabilized or maintained constant by mounting the two plates in a sealed container, preferably in a reducing atmosphere such as hydrogen.

With reference to sealing the dynamic capacitor off from the atmosphere, one feature of the invention is the simplification of the enclosure problem by mounting the capacitor plates in an envelope of non-magnetic material and actuating the plates magnetically from a power source outside the envelope. In accord with this concept, the two capacitor plates in the preferred practice of the invention are of elongated configuration and are mounted in a relatively small tube similar to a common vacuum tube with base prongs by means of which it may be replaceably plugged into a circuit. Such a tube may be fabricated of glass at relatively low cost. The simplicity of the enclosed structure and the relatively small total area of the enclosed surfaces simplify the problem of completely removing air and moisture from the tube prior to the introduction of the final gas content, while the glass envelope provides a permanent and reliable seal thereafter.

In a typical dynamic capacitor as heretofore constructed in the art, for example, as set forth in the prior patents mentioned above, one of the capacitor plates is fixed in position and is of relatively heavy, rigid construction. The other plate is mounted for vibration by suitable means energized by an alternating current source, the frequency of the vibration being the same as the frequency of the source.

One object of the present invention in this respect is to provide an improved construction for higher efficiency.

This object is attained in part by making both of the plates movable and responsive to the electromagnetic means. A further improvement for attaining this object is the use of an alternating magnetic field in such manner as to magnetize the two plates with like polarity at neighboring ends thus causing the two plates to repel each other at the frequency of reversal of the magnetic field. Thus, with the magnetic field reversing twice for each alternation of the energizing current, the dynamic capacitor vibrates at twice the frequency of the alternating current source.

As a result of operating at double the line frequency, the frequency bandwidth of instrument response can be increased, that is, instrument response time can be decreased, and the effect of stray line frequency pickup can be reduced. Furthermore, an increase in modulator frequency is found to result in improved signal-to-noise ratio. As a result of employing two similar vibrating elements a simpler, more compact and efficient capacitor-modulator unit is provided. Further increase in efficiency as well as convenience of manufacture is accomplished by using capacitor plates which take the form of vibratory reeds, these preferably having a natural resonant frequency near that of the doubled excitation frequency, and offsetting the base portions of the reeds. The offsetting, by increasing the spacing of the inactive base portions, minimizes stray capacitance and thereby increases the conversation efficiency of the capacitor.

The higher orders of frequency multiplication, for example quadrupling, are feasible if the reed is tuned, as by designing for higher natural resonant frequencies, to higher harmonics of the A. C. driving signal.

An additional object of the invention is substantially to eliminate the effect upon the dynamic capacitor of electrostatic charges accumulating on the surrounding envelope, and of electrostatically induced stray signal of line frequency derived from the exciting coil. This object is attained by coating the envelope wall with a conductive film.

An important feature of the invention is that all of the improvements in the dynamic capacitor explained above that increase efficiency also result in lower cost. In fact, the new dynamic capacitor can be constructed at substantially less than 5% of the cost of similar prior art devices. Being, moreover, especially adaptable to mass production techniques, the cost can be reduced still further as the device is manufactured in quantity.

With reference to the dynamic capacitor electrometer as a whole, the invention has the same broad object of both providing an electrometer of improved performance and substantially reducing its cost. In this regard the more specific objects of the invention include: avoiding the necessity of elaborate shielding of the input signal connections; eliminating the need for an oscillator to drive the dynamic capacitor; avoiding the use of batteries and the usual regulated power supply, and providing a simple source of twice the line frequency to serve as a reference signal for the synchronous demodulator.

The purpose of the usual oscillator is to vibrate the dynamic capacitor at a suitable frequency which as a minimum must be substantially higher than the variations of the signal to be measured. In general, as explained above, further increase of frequency above the minimum results in further gains in performance. A feature of the present invention is that the need for the usual oscillator is eliminated by exciting the capacitor-modulator with an A. C. power source in an arrangement which effectively at least doubles that frequency, as explained. As indicated above, it is desirable to rectify or demodulate the output of the electrometer and to return the resulting signal by negative feedback to the input through a current measuring device. In such an arrangement, the measuring device indicates the magnitude of the direct current input signal applied to the dynamic capacitor-modulator. In the preferred practice of the invention, demodulation of the A. C. amplifier is made synchronous with the vibrating modulator by basing the synchronous reference signal, of frequency equal to that of the modulator, on the same voltage source that energizes the modulator. The necessary frequency-multiplied reference signal can be made available from the line frequency source in various ways.

As a feature of the invention in the embodiment particularly described herein, simplicity is achieved by taking the required reference signal of double line frequency from the output of the rectifier used for the D. C. plate supply, specifically, from the inductor in that output which serves also as a filter element.

It may be noted that higher frequencies, particularly higher even harmonics of the line frequency, can similarly be derived from a rectifier output for use as a synchronizing signal when the capacitor-modulator is driven at even multiples higher than 2 of the line frequency.

To eliminate the need for elaborate shielding of the input against stray signal, which may be particularly strong and detrimental at the line frequency, the present invention features high attenuation of stray line frequency by means of a rejection filter at the input, preferably positioned ahead of the input grid. This is combined with feedback of high frequency components through a path which shunts the input terminals. Unless an efficient filter system is provided, such signals entering the input can cause overloading of the amplifier with consequent faulty operation. The preferred filter of the present invention is a multiple section filter of the infinite rejection type designed to reject the line frequency and is positioned in front of the capacitor-modulator. However, the inclusion of such a filter within a high gain feedback loop in the absence of special measures leads to oscillation, because of the difficulty of controlling loop gain and phase near the critical point. As a feature of this invention, therefore, the high frequency portion of the feedback signal is applied to one of the shunt elements of the input filter, whereby a shunt path across the input terminals is provided for frequencies in the range near the critical point. In our preferred embodiment this feedback is applied to the next-to-the-last shunt capacitor. In this way, the phase shift characteristic of the input filter is caused to have but a secondary effect on feedback loop design considerations. By virtue of this shunt feedback arrangement, the present circuit eliminates the conflict between the need for more than two RC input filter sections to remove unwanted input frequencies and the necessity for limiting the feedback to two RC filter sections if undue circuit complexity is to be avoided.

In the present specific adaptation of the electrometer to the measurement of hydrogen-ion concentration, one object of the invention is to provide a means for adjusting the zero point of the instrument which compensates for spurious D. C. components introduced by the pH-sensitive electrode system, and, to a relatively small extent, by the dynamic capacitor. In the electrode system, the D. C. component referred to here is commonly termed "asymmetry potential," this being a characteristic of any given electrode assembly, which characteristic varies only slowly over long periods of time and is independent of the ion concentration of the sample solution. The component introduced by the dynamic capacitor arises from the contact potential difference of its surfaces.

In applications other than pH measurements, a similar need may exist for a zero adjustment of wide range compared to the inherent zero stability of the instrument itself, for the purpose of zero suppression and the like. The usual expedient is to provide a battery-powered potentiometer control as a means of furnishing a zero-adjusting potential either positive or negative with respect to the ground reference potenial of the instrument.

In the present embodiment of the invention, however, no recourse to use of batteries is made, and a means is provided whereby a regulated source of single polarity only may furnish an adjustment of either polarity. Moreover, a simple means of regulation is provided for this purpose which does not require that the D. C. plate supply as a whole be regulated.

Although the apparatus and method of this invention have been described with particular reference to measurement of voltage signals, it is apparent that the invention is likewise applicable to the measurement of current signals. This adaptation merely requires that a resistor of known value be connected across the input terminals, which resistor conducts the current to be measured, and exhibits a proportional voltage drop across its terminals. This voltage drop is measured in the manner herein disclosed.

Another valuable adaptation of the invention is its use as a regulated power supply. It will be appreciated that if a constant and stable voltage, such as that supplied by a standard cell, is applied to the input terminals, then the D. C. feedback current, ordinarily measured by the meter, will be highly constant. This regulated current may be usefully applied to an external load, for example, in electrolytic analysis procedures, where reliable constancy of current is desired. The advantage thereby provided over conventional regulators is that output drift predominantly occasioned by so-called "grid bias drift" in the first amplifier tube is completely eliminated. While the circuit of our invention has been described primarily in terms of use with a dynamic capacitor-modulator, it will be appreciated that it is generally useful in any amplifier wherein a D. C. input signal is modulated, particularly if modulated at a multiple of the modulator-exciting signal, by the principle herein shown. This can occur in amplifiers using the signal chopper principle or using input resistors sensitive to alternating magnetic fields.

The above and other objects and advantages of the invention will be apparent in the following detailed description taken with the accompanying drawings.

In the drawings, which are to be regarded as merely illustrative:

Figure 1:
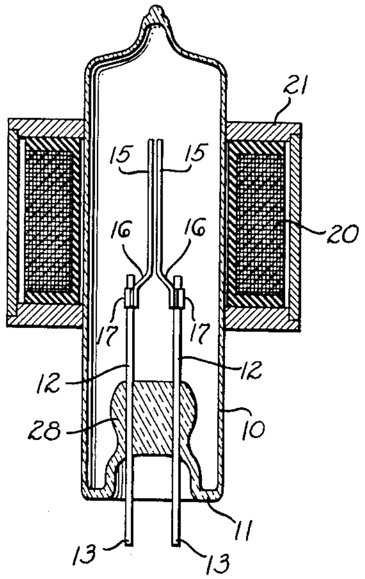
Fig. 1 is a view of the presently preferred embodiment of the dynamic capacitor, partly in side elevation and partly in section.

The presently preferred embodiment of the new dynamic capacitor shown in Fig. 1 has a tubular envelope 10 of nonmagnetic material, in this instance glass, with a re-entrant bottom wall 11. A pair of conductors 12 extending through and sealed in the bottom wall 11 are of substantial diameter and rigidity so that the lower external ends 13 of the conductors may serve as base prongs whereby the device may be plugged into a circuit in the same manner as a conventional vacuum tube.

Figure 3:
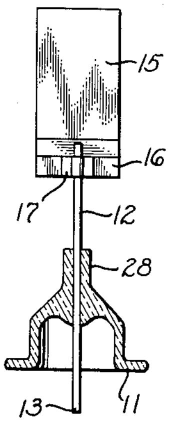
Fig. 3 is a similar view showing how the conductors that support the plates of the dynamic capacitor are mounted in the end wall.

The plates 15 of the dynamic capacitor comprise a pair of sheet metal members mounted face-to-face, each plate having an offset base portion 16. These base portions are turned away from each other to provide relatively large spacing therebetween and to permit the plates to be mounted on and supported by the two separated conductors 12. As shown in Figs. 1 and 3, each plate 15 may be suitably bonded to the corresponding conductor 12, for example, by welding, with an added reinforcing strip 17 across the joint.

The sheet material of the capacitor plates 15 is preferably a ferromagnetic metal. The flat body portions of the plates 15 may be approximately ⅝" wide, 1" long and .02" thick. Spaced approximately .004" apart, these provide a static capacitance of approximately 35 micro-microfarads.

In the construction shown, the external means for actuating the plate 15 comprises an electromagnetic coil 20 in a suitable casing 21 surrounding the tubular envelope 10 in the region which encloses the two plates 15. When the electromagnetic coil 20 is energized by alternating current it produces an alternating magnetic field so oriented with respect to the two plates 15 as to cause the two plates to be magnetized with neighboring ends of like polarity. Since the mutual repulsive force actuating the reeds is independent of the polarity of the magnetic field, the two plates 15 are periodically mutually repelled at twice the frequency of the current and the natural frequency of the structure inside the envelope 10 is sufficiently close to this doubled frequency to permit the two plates 15 to vibrate efficiently at the same doubled rate.

Figure 4:
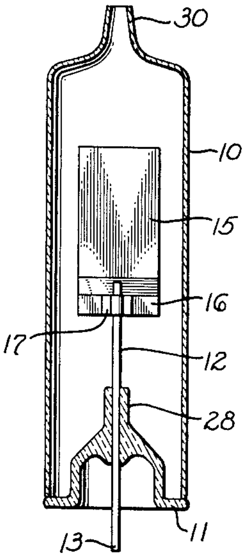
Fig. 4 is a sectional view of the completed glass envelope ready for the evacuation of air and moisture.
Figure 2:
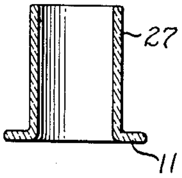
Fig. 2 is a sectional view of a "flare" or glass end wall for the envelope of the dynamic capacitor.

The presently preferred procedure for fabricating the dynamic capacitor is illustrated by Figs. 2–4.

When the two blanks for a dynamic capacitor have been cut and bent to form the offsets 16 the two plates are carefully sandblasted. After the sandblasting, the plates are handled with exceeding care to avoid contamination and preferably the two plates to be paired to form a dynamic capacitor are immediately positioned face-to-face for mutual protection during subsequent fabrication steps.

In the next step, the two conductors 12 for holding the two plates 15 are maintained in the desired spaced positions and then sealed in an end wall member 11. The end wall member 11 has the initial separate form shown in Fig. 2, being a flared member with a tubular wall 27. The tubular wall 27 is heated to a suitably plastic state and then is simply pinched to form a solid glass body 28 as indicated in Fig. 3 embedding and sealing the two conductors 12. The glass and the conductors, of course, have approximately the same coefficient of thermal expansion. The pair of sandblasted plates are then supported in a suitable jig and welded to the conductors 12.

After the capacitor assembly is mounted in the wall member 11 as shown in Fig. 3 the two capacitor plates 15 are carefully adjusted to the desired uniform spacing and then the shell of the glass envelope 10 is positioned as shown in Fig. 4 and the shell is fused to the wall member 11 to complete the envelope.

At this stage in the fabrication procedure, a nozzle 30 is drawn at upper end of the envelope to provide a convenient point for evacuating the structure. Preferably, the envelope is exhausted to a pressure of $10^{-4}$ mm. Hg; and a flame is applied to the envelope to remove residual moisture and gases. The envelope may be sealed in evacuated state, but it is preferable to fill the envelope with a suitable gas for the sake of the damping effect of the gas on the vibrating plates 15. Heretofore, inert gases have been employed for this purpose. However, it has been found that random signal disturbances observed in the instrument could be attributed to the effect of ionizing radiation occurring in the environment and operating on the relatively large ionization cross section of the inert gas. This effect is greatly reduced when, according to the present invention, hydrogen gas, presenting a small ionization cross section, is employed. The hydrogen gas so employed furthermore provides the necessary damping and a reducing atmosphere toward which the vibrating plates are chemically stable, wherefore changes in contact potential are minimized. The use of hydrogen thus makes it possible to use inexpensive base metals for the plates. The pressure of the hydrogen may, for example, be 1 atmosphere.

A conductive film is finally applied to the exterior of the envelope, but this is not allowed to extend over the base portion thereof, where high insulation between the leads must be maintained. This coat may be graphitic or metallic, and is applied in any desired conventional manner, to provide effective shielding against electrostatic interference from charges on the envelope or signal in the exciting coil. Preferably the coating is grounded by suitable contact means.

Figure 5:
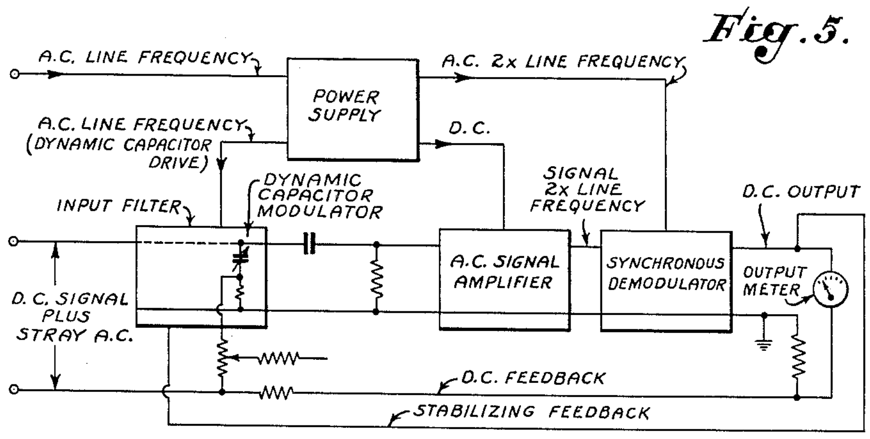
Fig. 5 is a block diagram of the preferred embodiment of the electrometer.
Figure 6:
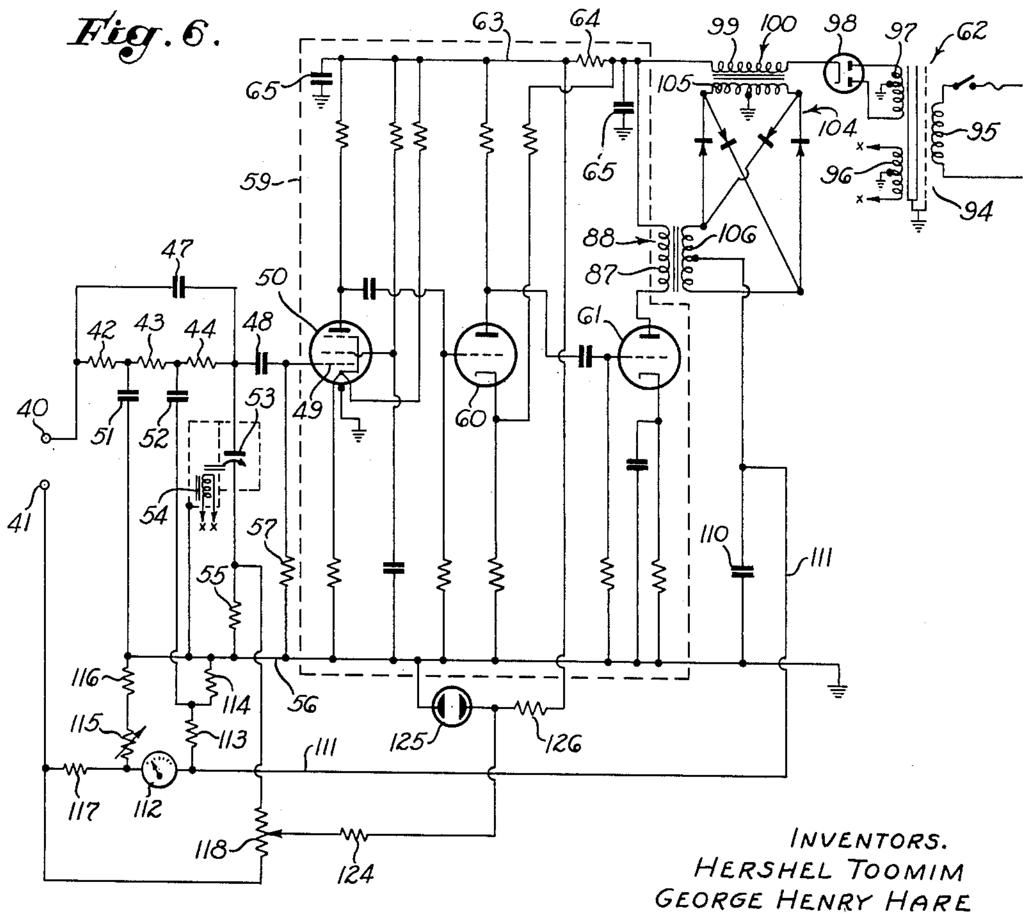
Fig. 6 is a wiring diagram of the electrometer.

The manner in which the invention may be embodied in an electrometer to serve specifically as a pH meter may be understood by reference to Figs. 5 and 6.

Fig. 5 is a block diagram showing the general operating principles of the measuring instrument. It will be noted that line frequency A. C. current from the power supply is applied to the energization of the dynamic capacitor-modulator and that the modulator is included in the input filter. The resulting double line frequency A. C. output of the dynamic capacitor-modulator is applied to the input of the A. C. amplifier, the amplifier being energized by direct current from the power supply. The output of the A. C. amplifier is applied to the synchronous demodulator which, as shown, receives a double line frequency reference signal from the power supply, the reference signal being inherently synchronous with the A. C. signal produced by the dynamic capacitor-modulator. The D. C. output from the synchronous demodulator passes through a calibrated resistor to the circuit "ground," i. e., the point of zero reference potential for the input signal, the current being measured on a suitable meter, and the voltage generated across the resistor is fed back to the input terminals in series opposition to the input signal. The total input signal applied to the dynamic capacitor is thereby substantially degenerated to zero while the amplified current measured by the indicating meter is accurately proportional to the input signal to be measured.

Fig. 6 shows the components of a pH meter constructed in accord with the block diagram of Fig. 5.

The electrometer shown in Fig. 6 has an input terminal 40 for connection with the usual pH-responsive glass electrode and a second input terminal 41 for connection with the cooperating reference electrode.

The input terminal 40 is connected directly to a multiple section input filter or infinite attenuation type adjusted preferentially to attenuate stray input signal of line frequency, and in this instance comprises three resistance-capacitance sections. The three resistors 42, 43 and 44 of the three filter sections connected in series, are shunted by a capacitor 47 and are coupled by a capacitor 48 with the input grid 49 of the first tube 50 in the A. C. signal amplifier. Parallel capacitors 51 and 52 complete the first two sections of the input filter and the previously described dynamic capacitor-modulator, indicated at 53, comprises what may be regarded as the last section of the input filter. The plates of the dynamic capacitor-modulator 53 are energized in the manner heretofore described by an electromagnetic coil 54. The dynamic capacitor-modulator 53 is returned to ground through a suitable resistor 55 connected to a common ground lead 56 and the input grid 49 is connected to the ground lead through a resistor 57.

The amplifier for the A. C. signal generated by the dynamic capacitor-modulator 53 is indicated by the dotted outline 59. This amplifier comprising three resistance-coupled vacuum tubes 50, 60 and 61 is of conventional construction. The plate circuits of the amplifier are connected to a suitable D. C. power supply generally designated 62 by way of a line 63 that includes a resistor 64 and is coupled to ground through two filter capacitors 65.

The power supply 62 includes a transformer 94 having a primary 95 for connection to the A. C. power line. The transformer has one secondary 96 for energizing the electromagnetic coil 54 of the dynamic capacitor-modulator 53 and has another secondary 97 which is part of a center-tapped, full-wave rectifier that includes a vacuum tube 98. The output of the vacuum tube 98 is fed to the D. C. power line 63 through the primary coil 99 of a transformer 100, the primary coil serving as a choke for the power supply.

The amplified A. C. output of the three-tube amplifier is demodulated by a synchronous double-balanced demodulator generally designated 104 which in this embodiment is of the "ring" type and includes both secondary coil 105 of the transformer 100 and the secondary coil 106 of the transformer 88. The center of the secondary coil 105 is made the ground return point for the demodulator circuit as shown.

The output current of the demodulator at the center tap of the secondary coil 106 is filtered by capacitor 110, which is returned to ground, and is conducted by feedback line 111 through the indicating milliammeter 112, variable resistor 115 and the fixed output resistor 116 to the circuit ground. Resistor 116 is a calibrating resistor which determines the voltage or pH range of the meter 112. Variable resistor 115 is a compensating element, manually adjustable, or forming the sensitive element of a resistance thermometer, which adjusts instrument response to correct for the temperature dependent output voltage of the indicating electrode.

The voltage, referred to ground, which is induced at the point of common connection of the meter 112 and the variable resistor by passage of the feedback current through resistor elements 115 and 116, is applied to input terminal 41 by way of resistor 117.

Resistor 126, gas discharge tube 125 (preferably a neon voltage regulator tube) and resistor 124 comprises a regulator for supplying current at substantially constant voltage. Signal from this source is adjustably apportioned by potentiometer 118 for application to resistors 55 and 117. Resistors 113 and 114 comprise a tapped voltage divider between feedback line 111 and the circuit ground for limiting the high frequency signal feedback in shunt across the input. This high frequency signal is taken from the point of common connection between resistors 113 and 114 and applied to capacitor 52 of the input filter as shown.

The operation of the electrometer may be understood from the foregoing description. The D. C. signal to be measured together with any superimposed stray A. C. components is applied to the input filter which serves to reduce the amplitude of the stray A. C. components sufficiently to keep such components from affecting the operation of the A. C. amplifier. The resistor 44 in the last filter section may be considered as the isolating resistor for the dynamic capacitor-modulator 53. The capacitor 48 isolates the dynamic capacitor-modulator from grid current effects in the first stage of the amplifier.

The D. C. signal to be measured first appears across the dynamic capacitor-modulator which, as previously explained, generates a corresponding double-line frequency A. C. signal proportional in magnitude to the applied D. C. signal.

The A. C. output of the amplifier, of double the line frequency, is converted to D. C. in the synchronous rectifier 104 which is supplied with a reference voltage of double the line frequency by the winding 105 coupled to the choke winding 99 of the power supply. The resulting D. C. output has residual A. C. components which are removed in part by an oput filter comprising the capacitor 110 in combination with internal impedance of the demodulator.

The filtered output D. C., measured by a meter 112, traverses the series resistor elements 115 and 116 to ground. The voltage generated across this resistor combination is fed back to be applied to the capacitor-modulator effectively in series with the input voltage to be measured. If the amplifier is of sufficiently high gain, and if, as provided by the circuit design, the feedback D. C. voltage is always of such polarity as to oppose the input signal, then the feedback current will be such as to generate a voltage across resistor elements 115 and 116 always closely equal in magnitude to the input voltage. The current measured by meter 112 will be accurately proportional to the D. C. input voltage signal, the full scale voltage range being the product of full scale meter current and the combined resistance of elements 115 and 116. The variable resistor 115 may be a manual control, calibrated in degrees of temperature, or may be the resistance element of a thermometer immersed in the sample to be measured, along with the measuring electrodes. By this means the pH-indicating scale is expanded or contracted to compensate for change of response of the sensing electrode as a function of its temperature.

It will be observed that a change of polarity in the voltage to be measured, applied to the dynamic capacitor, results in a 180° change of phase in the induced and subsequently amplified A. C. signal. The demodulator, however, being synchronous with the capacitor-modulator and phase sensitive, correspondingly reverses the polarity of its output signal, thereby providing a feedback voltage always of polarity to oppose the measured voltage, regardless of polarity of the latter.

Adjustment of the amplifier zero, i. e., indicator scale position corresponding to zero volts input, in order to accommodate contact potential differences in the capacitor-modulator and the variable asymmetry potential of electrode systems, is obtained as follows: The gas discharge tube 125, preferably a neon voltage regulator tube, in series with resistor 126 across the D. C. plate supply, provides a simple source of regulated voltage. Current from this source is divided by potentiometer 118 in a variable ratio between resistors 117 and 55. The currents applied through these resistors produce voltages having respectively opposite effects in shifting the zero point. Current through resistor 55 injects a voltage between the low impedance side of the capacitor-modulator and a point of zero reference potential for the input signal (herein indicated as the circuit ground), and shifts the zero negatively. Current through 117 injects a voltage, of the same polarity with respect to the zero reference point, in series with the feedback voltage, and shifts the zero positively. Accordingly, adjustable resistor 118 serves as a bi-directional zero control, although powered from a source of positive polarity only. It may be noted that although resistors 117, 118 and 55 form a series path to ground which shunts the calibration resistances 115 and 116, the combined resistance of the three former elements is sufficiently high compared to resistors 115 and 116 to leave the calibration accuracy unaffected.

The three-section input filter positioned ahead of the amplifier rejects stray input signal of line frequency, while feedback of high frequency components stabilizes the amplifier against oscillation which the input filter would otherwise induce. In order that phase shift in the feedback high frequency components be kept within the permissible maximum, the high frequency feedback is applied to some point of the input filter other than the first filter section. In this instance, for example, the return is to the second filter section, but in some applications of the invention the return may be to the third filter section on the low-impedance side of the capacitor-modulator.

Our description in specific detail of the presently preferred embodiment of the invention will suggest to those skilled in the art various changes, substitutions, and other departures from our disclosure.

We claim as our invention:

1. In a dynamic capacitor, the combination of: two magnetizable elements having relatively extensive electrically-conductive surfaces; means mounting said elements with said surfaces in close proximity and in spaced-apart relation to form a capacitor, said mounting means including means for resiliently mounting at least one of said elements for free vibrational movement toward and away from the other and for limiting movement of said one element toward the other to maintain said spaced-apart relation therebetween, said elements tending to become magnetized with like polarity along similarly oriented axes when in a magnetic field so that variations in such magnetic field will induce a relative vibrating motion of said elements in a direction transverse to said magnetic axes; and means for applying such a varying magnetic field to said magnetizable elements to induce said vibrating motion.

2. The combination defined in claim 1, including means for stabilizing the contact potentials of said electrically-conductive surfaces comprising abraded electrically-conductive surfaces on said magnetizable elements.

3. The combination defined in claim 1, including means for stabilizing the contact potentials of said electrically-conductive surfaces comprising sandblasted electrically-conductive surfaces on said magnetizable elements.

4. The combination defined in claim 1, including a sealed enclosure containing said elements, and a gaseous damping medium for said elements in said sealed enclosure.

5. In a dynamic capacitor, the combination of: two magnetizable elements having relatively extensive electrically-conductive surfaces; means mounting said elements with said surfaces in close proximity and in spaced-apart relation to form a capacitor, said mounting means including means for resiliently mounting each of said elements for free vibrational movement toward and away from the other and for limiting movement of said elements toward and away from the other to maintain predetermined minimum and maximum spacings therebetween for a given magnetic field applied thereto, said elements tending to become magnetized with like polarity along similarly oriented axes when in a magnetic field so that variations in such magnetic field will induce a relative vibrating motion of said elements in a direction transverse to said magnetic axes; and means for applying said varying magnetic field to said magnetizable elements to induce said vibrating motion.

6. In a dynamic capacitor, the combination of: two relatively movable, continuously-spaced-apart, magnetizable components including elements having relatively extensive electrically conductive surfaces forming a capacitor, at least one of said components including resilient means mounting it for free vibrational movement toward and away from the other of said components and for limiting movement of said one component toward and away from said other component to maintain predetermined minimum and maximum spacings therebetween for a given magnetic field applied thereto, whereby no contact between said components occurs, said components tending to become magnetized with like polarity along similarly oriented axes when in a magnetic field so that variations in such magnetic field will induce a vibrating motion of said one component toward and away from said other component, said motion being transverse to the direction of said magnetic axes; means for applying such a varying magnetic field to said components to induce said vibrating motion; and supporting means electrically insulating said components from each other.

7. A dynamic capacitor as defined in claim 6 including a sealed enclosure containing said components and including in said enclosure an atmosphere of a gas presenting a small ionizing cross section to ionizing radiation.

8. A dynamic capacitor as defined in claim 7 wherein said gas is a reducing gas.

9. A dynamic capacitor as defined in claim 6 wherein each of said components includes resilient means mounting it for free vibrational movement toward and away from the other of said components and for limiting movement thereof toward and away from the other of said components.

10. A dynamic capacitor as set forth in claim 6 in which said two components have base portions offset for increased spacing to reduce any stray capacitance.

11. A dynamic capacitor as set forth in claim 6 in which the natural resonant frequency of relative movement between said elements is a higher harmonic of the frequency of alternation of the magnetic field.

12. A dynamic capacitor as set forth in claim 6 which includes electrostatic shielding means enclosing said components.

13. In an amplifying system for response to an input signal of small magnitude, the combination of: two elements including relatively extensive electrically-conductive surfaces forming a capacitor, said elements being magnetizable with like polarity along similarly oriented axes; means for applying said input signal to said capacitor to charge and thereby establish a voltage across said capacitor; means mounting said elements for relative harmonic vibration toward and away from each other to vary the capacitance of said capacitor and thereby induce a correspondingly varying harmonic output signal, said mounting means including means for resiliently mounting at least one of said elements for vibratory movement between a position close to and spaced from the other of said elements and a position farther from and spaced from said other element; and means for applying an alternating magnetic field along a direction substantially parallel to said axes of said elements to induce said relative harmonic vibration.

14. A dynamic capacitor comprising the combination of: two relatively movable, continuously-spaced-apart, magnetizable components including elements having relatively extensive electrically-conductive surfaces forming a capacitor, each of said components including resilient means mounting it for free vibrational movement toward and away from the other of said components and for limiting movement thereof toward and away from the other of said components to maintain predetermined minimum and maximum spacings between said components for a given magnetic field applied thereto, whereby no contact between said components occurs, said components being magnetizable in a magnetic field with like polarity along similarly oriented axes so that a varying magnetic field will induce vibrating motion of said components toward and away from each other, said motion being transverse to the direction of said magnetic axes; supporting means electrically insulating said components from each other; and means energized by alternating current for generating said varying magnetic field, said field being applied cyclically to magnetize said elements with like polarity and to induce a relative vibrating motion by mutual repulsion between said elements at a whole multiple of the frequency of said alternating current, said whole multiple being at least two.

15. A dynamic capacitor as set forth in claim 14 in which said means for generating said varying magnetic field is an electromagnet.

16. A dynamic capacitor as set forth in claim 15 in which said electromagnet is in the form of a coil surrounding said two elements.

17. A dynamic capacitor as set forth in claim 14 in which said elements are mounted in a sealed chamber of nonmagnetic material and said means for generating said varying magnetic field is an electromagnet outside said chamber.

18. A dynamic capacitor as set forth in claim 17 in which said chamber has a conducting surface to serve as an electrostatic shield for said elements.

19. A dynamic capacitor as set forth in claim 18 in which the walls of said chamber are made of non-metallic material with a conducting coating thereon to serve as the electrostatic shield.

References Cited in the file of this patent

UNITED STATES PATENTS

| | | |
|---|---|---|
| 2,011,710 | Davis | Aug. 20, 1935 |
| 2,175,354 | Lewin | Oct. 10, 1939 |
| 2,187,115 | Ellwood | Jan. 16, 1940 |
| 2,372,231 | Terman | Mar. 27, 1945 |
| 2,482,801 | Rouy | Sept. 27, 1949 |
| 2,524,165 | Freedman et al. | Oct. 3, 1950 |
| 2,556,846 | Longacre | June 12, 1951 |
| 2,570,315 | Brewer | Oct. 9, 1951 |
| 2,573,329 | Harris | Oct. 30, 1951 |
| 2,589,134 | Pyle | Mar. 11, 1952 |
| 2,611,039 | Hepp | Sept. 16, 1952 |
| 2,632,791 | Side | Mar. 24, 1953 |

FOREIGN PATENTS

| | | |
|---|---|---|
| 414,374 | Great Britain | July 30, 1934 |
| 536,695 | Great Britain | May 23, 1941 |
| 562,461 | Great Britain | July 3, 1944 |